United States Patent
Stiehler

(10) Patent No.: US 9,970,314 B2
(45) Date of Patent: May 15, 2018

(54) INNER RING FOR FORMING A GUIDE BLADE RING, AND GUIDE BLADE RING AND TURBOMACHINE

(75) Inventor: Frank Stiehler, Bad Liebenwerda (DE)

(73) Assignee: MTU Aero Engines GmbH, Munich (DE)

( * ) Notice: Subject to any disclaimer, the term of this patent is extended or adjusted under 35 U.S.C. 154(b) by 1638 days.

(21) Appl. No.: 13/461,407

(22) Filed: May 1, 2012

(65) Prior Publication Data

US 2012/0282088 A1     Nov. 8, 2012

(30) Foreign Application Priority Data

May 2, 2011   (EP) .................................... 11164425

(51) Int. Cl.
*F01D 17/16*     (2006.01)
*F01D 9/04*      (2006.01)
*F04D 29/56*     (2006.01)
*F04D 29/64*     (2006.01)

(52) U.S. Cl.
CPC ........... *F01D 17/162* (2013.01); *F01D 9/042* (2013.01); *F04D 29/563* (2013.01); *F04D 29/644* (2013.01); *F05D 2260/30* (2013.01); *Y02T 50/672* (2013.01)

(58) Field of Classification Search
CPC ............... F01D 9/04; F01D 9/02; F01D 17/14
USPC ....................... 415/160, 209.4, 210.1, 209.3
See application file for complete search history.

(56) References Cited

U.S. PATENT DOCUMENTS

| | | | |
|---|---|---|---|
| 6,887,035 B2 | 5/2005 | Bruce | |
| 7,510,369 B2 * | 3/2009 | Lytle | ............... 415/160 |
| 8,376,692 B2 * | 2/2013 | Stiehler | ......................... 415/160 |
| 2007/0059161 A1 | 3/2007 | Bouru | |
| 2010/0055455 A1 * | 3/2010 | Dauer et al. | ................... 428/338 |
| 2010/0232952 A1 | 9/2010 | Stiehler | |

FOREIGN PATENT DOCUMENTS

| | | | | |
|---|---|---|---|---|
| DE | 10 2006 024 085 A1 | 11/2007 | | |
| DE | 10 2009 004 933 A1 | 7/2010 | | |
| DE | 10 2009 004 934 A1 | 8/2010 | | |
| EP | 2093380 | 8/2009 | | |
| WO | WO 2007134585 A1 * | 11/2007 | .............. | F04D 17/16 |
| WO | WO2010/025339 | 3/2010 | | |

* cited by examiner

*Primary Examiner* — Justin Seabe
*Assistant Examiner* — Juan G Flores
(74) *Attorney, Agent, or Firm* — Davidson, Davidson & Kappel, LLC

(57) ABSTRACT

An inner ring for forming a guide blade ring for a turbomachine is disclosed, composed of at least two one-part ring segments having a plurality of openings, closed on the peripheral side, for accommodating journal bearings on the blade side, the outer diameter of the inner ring being at least 12 times larger than its height. Also disclosed are a guide blade ring having this type of inner ring and a turbomachine having this type of guide blade ring.

20 Claims, 5 Drawing Sheets

INNER RING FOR FORMING A GUIDE BLADE RING, AND GUIDE BLADE RING AND TURBOMACHINE

This claims the benefit of European Patent Application EP 111 644 25.8, filed May 2, 2011 and hereby incorporated by reference herein.

The present invention relates to an inner ring for forming a guide blade ring for a turbomachine, a guide blade ring having this type of inner ring, and a turbomachine having this type of guide blade ring.

BACKGROUND

Turbomachines such as aircraft engines generally have at least one adjustable row of guide blades on the compressor side, having a plurality of guide blades which are pivotable about their vertical axis, for setting optimal operating conditions. The row of guide blades together with a stationary inner ring which surrounds a rotor section forms a so-called guide blade ring. The inner ring is used for internal bearing of the guide blades, and has a plurality of radial openings for accommodating one journal bearing in each case on the blade side. It is proposed in DE 10 2006 024 085 A1 to form the inner ring from at least two semicircular ring segments having openings which are undivided in the axial direction and thus closed on the peripheral side, and to individually roll the ring segments over the journal bearings of the rotor blades mounted in housing halves. For this purpose, the ring segments are pretensioned to a constant clamping radius, positioned in the region of the journal bearings, and then relaxed. The inner ring, i.e., the guide blade ring, is uninstalled in a similar manner. The deformation and positioning of the inner ring segments is carried out with the aid of a clamping device disclosed in DE 10 2009 004 934 A1. However, special geometric and topological conditions of the inner ring and the guide blades must be maintained to allow this type of installation and deinstallation.

BRIEF SUMMARY OF THE INVENTION

It is an object of the present invention to provide an inner ring for forming a guide blade ring for a turbomachine which allows simple installation and deinstallation of a guide blade ring. Moreover, an additional or alternate object of the present invention is to provide a guide blade ring that is easy to install and uninstall, and a turbomachine that is optimized with respect to installation and maintenance.

The present invention provides an inner ring for forming a guide blade ring for a turbomachine, having a plurality of guide blades, has an outer diameter $D\_AR$ and a height $H\_R$, and is composed of at least two ring segments having a plurality of openings, closed on the peripheral side, for accommodating journal bearings of the guide blades. According to the present invention, the relationship $D\_AR/H\_R \geq 12$ is valid.

For a given ring outer diameter, the relationship allows a maximum ring height to be set. An inner ring designed according to this relationship allows simple and repeatable installation and deinstallation, at least for the use of materials which have become established for aircraft engines. In particular, unintended distortion of the ring segments during installation and deinstallation is prevented. Examples of materials include materials based on nickel, such as Inco718 or In625, chromium-nickel steels such as Jethete, A286, or 17-4PH, aluminum alloys such as $AlCu_2MgNi$ or RR350, and titanium alloys such Ti6242, Ti64, or titanium aluminide (TiAl). Likewise, the relationship may be used for ring segments made of fiber composites such as CFRP or GFRP. The relationship according to the present invention also allows a wide variation in blade pitches. For example, blade quantities from 10 to 150 blades per ring segment are possible.

To allow sufficient stability of the inner ring and thus of the guide blade ring, for a given ring outer diameter a minimum ring height may be dimensioned using the relationship $D\_AR/H\_R \leq 37$. However, the ratio may also be larger.

In one preferred exemplary embodiment, the geometry of the inner ring is designed in such a way that the inner ring has a residual maximum deformation of 0.2% after tension is relieved. In principle, however, it is preferred that the ring segments are only elastically deformed and are tension-free after installation.

A guide blade ring according to the present invention has a plurality of guide blades, an inner ring according to the present invention, a plurality of bearing bushes inserted into openings in the inner ring for accommodating journal bearings on the blade side, and a seal carrier for securing the bearing bushes in the openings. The guide blade ring may be easily and repeatably installed and uninstalled, and has a reduced number of parts due to the bearing bushes which are inserted directly into the openings.

To allow the bearing bushes to be inserted into the openings after the ring segments are positioned on the journal bearings, the journal bearings in the openings have a gap size s which corresponds to the wall thickness of the bearing bushes. Gap size s, i.e., the wall thickness, may be reduced practically arbitrarily. In particular, a zero gap size may be set if the bearing bushes are dispensed with, for example for openings having integral bearing surfaces. However, for maintenance reasons it is preferred for the bearing bushes, as wearing parts, to be easily replaceable. To achieve a minimum stability of the bearing bushes, for conventional materials as expressed by the relation $(D\_BR - D\_Z)/2 \geq 0.30$ mm, where $D\_BR$ is the inner diameter of the openings and $D\_Z$ is the outer diameter of the journal bearings, a minimum wall thickness of the bearing bushes of 0.30 mm is preferred.

For a small ring height $H\_R$ a small gap size is preferably set, and for a large ring height $H\_R$ a large gap size is preferably sought. It is advantageous to take the ring outer diameter into account via the relationship $(D\_AR/HR)*s \geq 3.60$ mm.

Furthermore, it is advantageous if an overall height of the blade sections accommodated in the openings is at least not significantly greater than the ring height according to the relationship $0.17 \leq H\_S/H\_R \leq 1.30$, where $H\_S$ is the height of the journal bearings and represents the height of inner shrouds on the blade side which are accommodated in enlargements of the openings.

To prevent the journal bearings from protruding too far from the openings, it is advantageous to set the height of the journal bearings in relation to the height of the inner shrouds, so that in one exemplary embodiment the following is valid: $1 \leq H\_Z/H\_TS \leq 6$, where $H\_Z$ is the journal bearing height and $H\_TS$ is the inner shroud height.

Simple installation and deinstallation with regard to the inner shrouds as well as a good sealing effect thereof in the enlargements is achieved when the following relation is used: $0.05 \text{ mm} \leq (D\_SR - D\_TS)/2 \leq 1 \text{ mm}$, where $D\_SR$ is the diameter of the enlargements and $D\_TS$ is the diameter of the inner shrouds.

A turbomachine according to the present invention has a guide blade ring according to the present invention, and is therefore easy to install and maintain.

Other advantageous exemplary embodiments of the present invention are the subject matter of further subclaims.

BRIEF DESCRIPTION OF THE DRAWINGS

One preferred exemplary embodiment of the present invention is explained in greater detail below.

DETAILED DESCRIPTION

Figure 1:
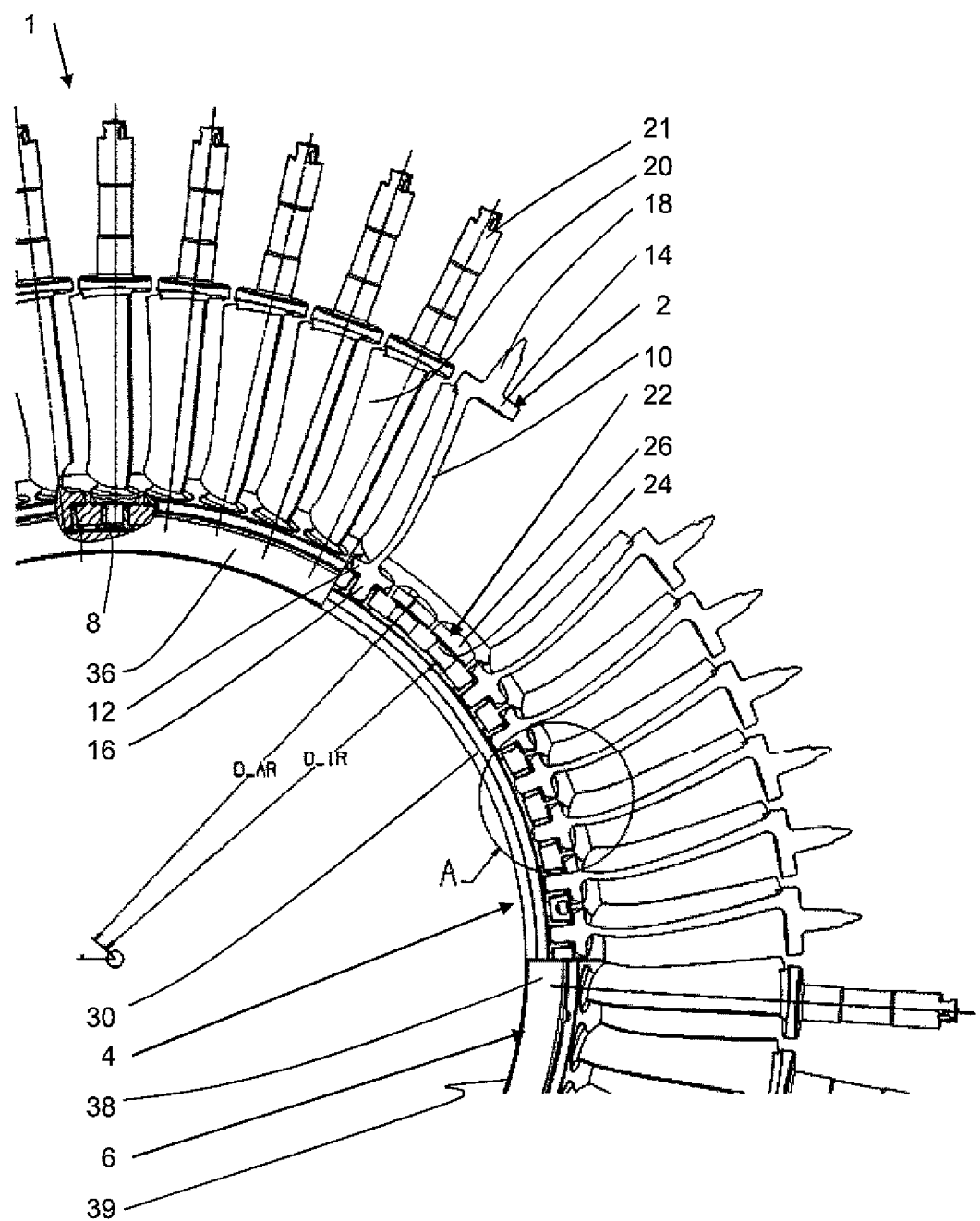
FIG. 1 shows a perspective illustration of a section of a guide blade ring according to the present invention.

In the figures, identical reference numerals are used for the same design elements; when there is a plurality of identical design elements in a figure, only one element is provided with a reference numeral.

According to the perspective illustration in FIG. 1, a guide blade ring 1 according to the present invention of an aircraft engine has a plurality of guide blades 2, an inner ring 4, a seal carrier 6, and a plurality of bearing bushes 8. Guide blade ring 1 is situated on the compressor side, and has up to 300 guide blades, for example.

Guide blades 2 are adjustable about their vertical axis extending in the radial direction, and in each case have a blade 10, an inner shroud 12, an outer shroud 14, an inner journal bearing 16, and an outer adjusting pin 18. Shrouds 12, 14 are used for radially sealing an annular space 20 on the hot gas flow side. Journal bearings 16 and adjusting pins 18 are used for the bearing of guide blades 2 on the end side. Guide blades 2 are adjusted with the aid of an adjusting device on the housing side which cooperates with adjusting pins 18; of the adjusting device, only handle-like hammer heads 21 guided on adjusting pins 18 are shown.

Figure 2:
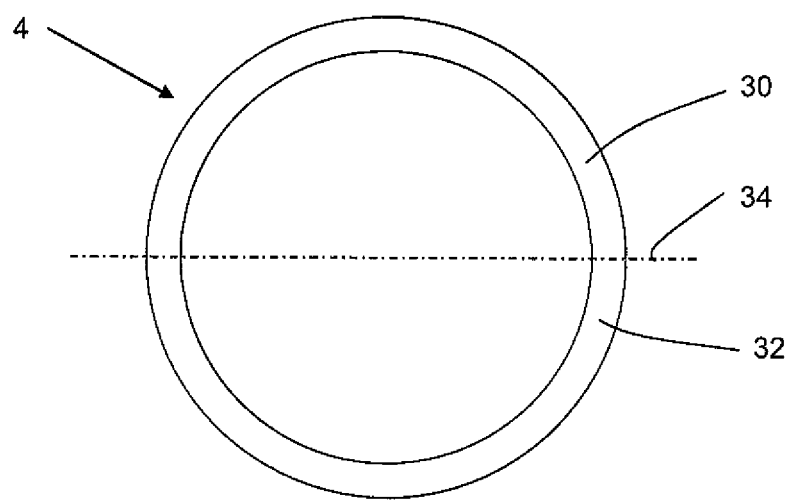
FIG. 2 shows a schematic front view of an inner ring according to the present invention.

Inner ring 4 according to the present invention encloses a rotor section, not shown, and is separated at a radial distance from the rotor section via a radial gap. The inner ring is used for radial inner support of guide blades 2, and has a plurality of openings 22 that are closed on the peripheral side. Openings 22 have a borehole-like design, and pass through inner ring 4 in the radial direction. The openings in each case have a radially inward bearing section 24 and a radially outward enlargement 26. As schematically shown in FIG. 2, inner ring 4 is composed of two semicircular ring segments 30, 32, each having a curved section of 180°, which are combined in the region of a parting plane 34 to form inner ring 4. However, a higher degree of segmentation of inner ring 4, into four ring segments, for example, is of course also possible.

Seal carrier 6 is used for securing bearing bushes 8 in openings 22 and for sealing the radial gap between the rotor and inner ring 4. FIG. 1 shows the seal carrier pushed radially inwardly onto inner ring 4; similarly as for inner ring 4, the seal carrier has two semicircular carrier segments 36, 38. An inlet coating (not shown), for example in the form of a honeycomb seal, is situated on an inner peripheral surface 39 facing the rotor in order to seal the radial gap.

Bearing bushes 8 are inserted into bearing sections 24 of openings 22, and are used to radially guide journal bearings 16.

In the installed state of guide blade ring 1, journal bearings 16 of guide blades 2 submerge into bearing sections 24, and are radially guided into the bearing sections with the aid of bearing bushes 8. At the same time, inner shrouds 12 of guide blades 2 submerge into enlargements 26 and seal, or essentially seal, same with respect to annular space 20 via a cylindrical section 28 (see FIG. 7).

Figure 3:
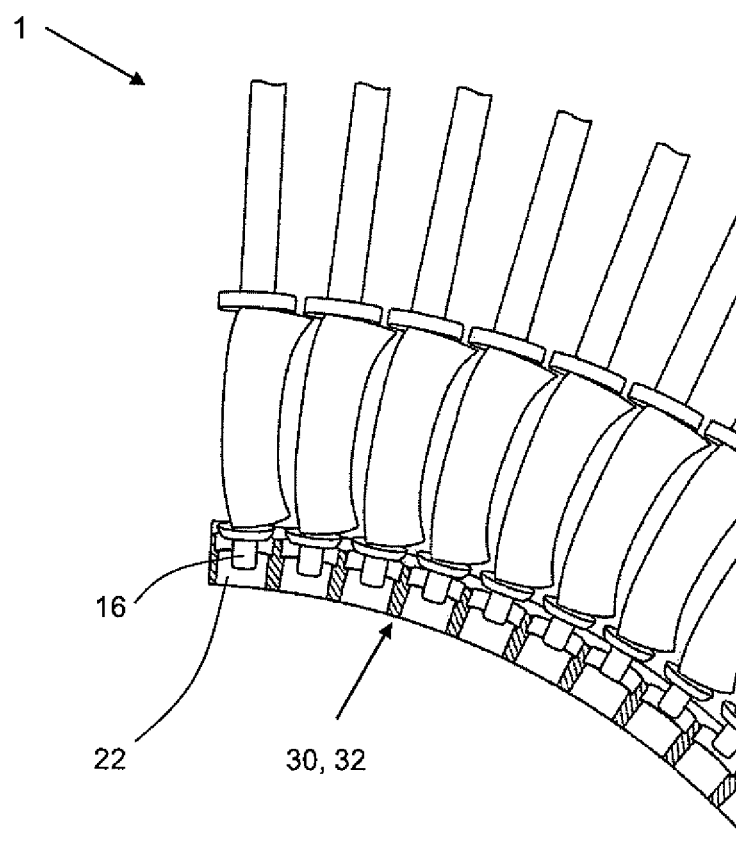
FIGS. 3 and 4 show method steps for installing the guide blade ring, i.e., inner ring, according to the present invention.
Figure 4:
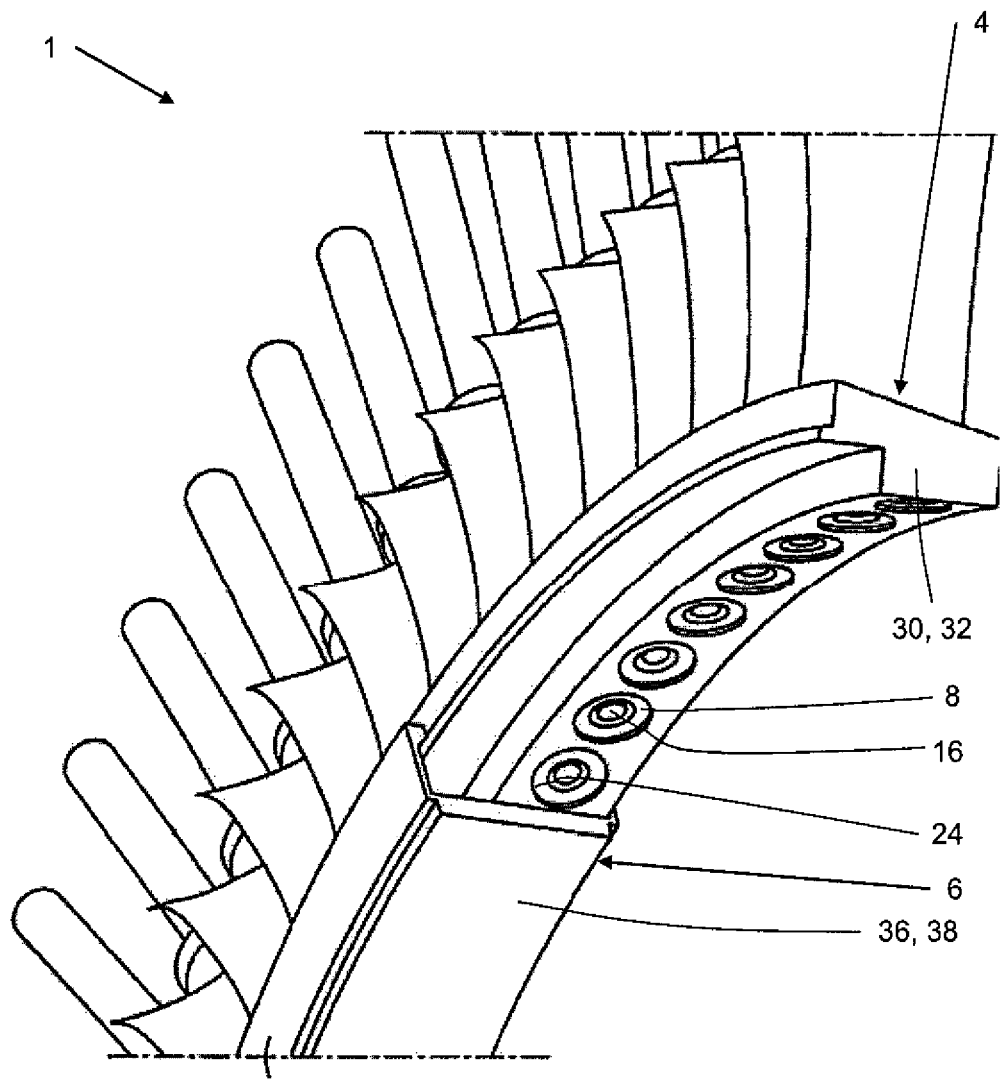

During an installation of guide blade ring 1, as indicated in FIG. 3, ring segments 30, 32 of inner ring 4 are not pushed over all journal bearings 16 at the same time, but, rather, are progressively pushed, one after the other, over the circumference. Ring segments 30, 32 have an outer radius R_AR, shown in FIG. 6, which by pretensioning is reduced to a constant clamping radius R_SP, likewise illustrated in FIG. 6. When the tension is subsequently relieved, ring segments 30, 32 relax and roll off over journal bearings 16. Outer radius R_AR of ring segments 30, 32 may be enlarged by gradually reducing the pretensioning, in a continuously variable manner or by staged reduction in steps, until the tension-free state is reached. After ring segments 30, 32 relax, as shown in FIG. 4, bearing bushes 8 are positioned in bearing sections 24 via a radial motion from the inside to the outside. Seal carrier 6 is subsequently installed. For this purpose, carrier segments 36, 38 are moved over ring segments 30, 32 in the peripheral direction until carrier segments 36, 38 and ring segments 30, 32 overlap and are in the same angular position relative to one another.

Figure 5:
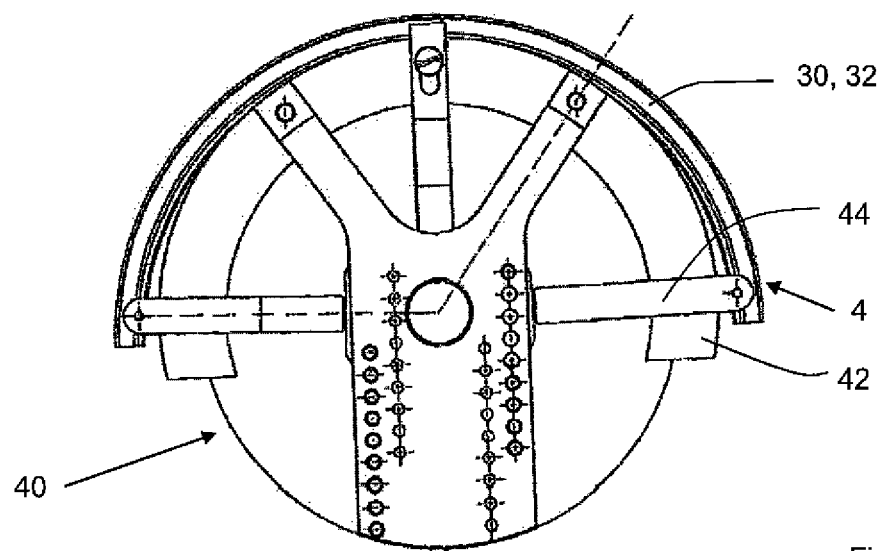
FIG. 5 shows an installation device for pretensioning ring segments of the inner ring.
Figure 6:
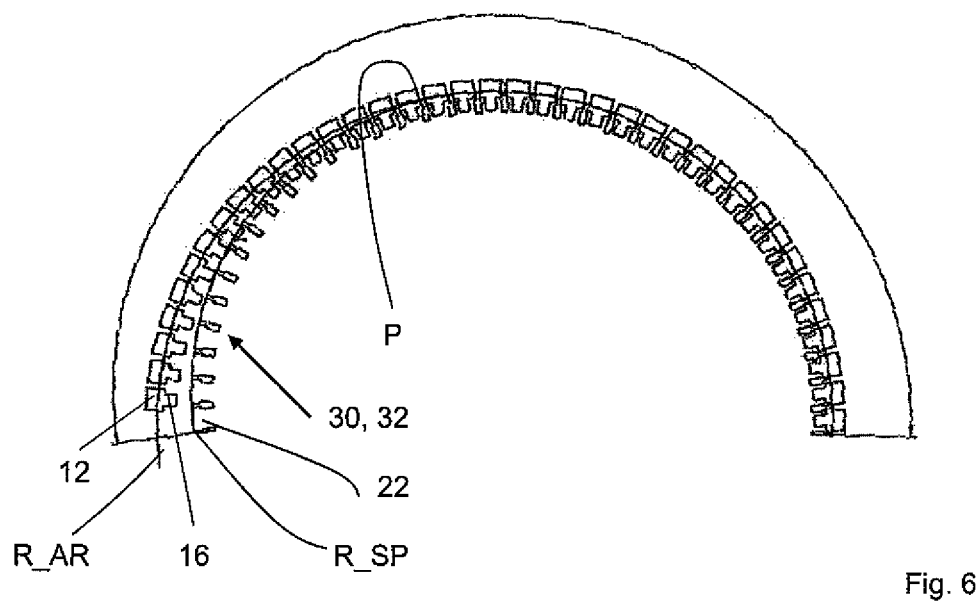
FIG. 6 shows a schematic tension relief motion of one of the ring segments.

An installation device 40 for installing ring segments 30, 32 is shown in FIG. 5. The installation device has a semicircular clamping section 42, i.e., a link, and three clamping arms 44 for pretensioning ring segments 30, 32 on clamping section 42. As schematically shown in FIG. 6, in which radii R_RA and R_SP are illustrated as curved lines for the sake of clarity, ring segments 30, 32 are rolled off over journal bearings 16 of guide blades 2 by relaxing clamping arms 44. The geometric conditions of guide blade ring 1 are such that openings 22 in ring segments 30, 32 are moved over journal bearings 16 and inner shrouds 12 without tilting or jamming. Outer radius R_AR of ring segments 30, 32 alternates at tangential contact point P, without transition, from constant clamping radius R_SP directly to original outer radius R_AR. Thus, while rolling off of ring segments 30, 32, which represent a hypocycloidal motion, takes place continuously, outer radius R_AR of ring segments 30, 32 makes a skip in curvature from clamping radius R_SP to its outer radius R_AR at co-rotating tangential contact point P. To enable this type of installation and deinstallation, ring segments 30, 32 must meet certain geometric or topological conditions, which are explained in greater detail below with reference to FIGS. 1 and 7:

Inner ring 4 has an inner diameter D_IR, an outer diameter D_AR which corresponds to twice the value of outer radius R_AR, and a height H_R, which relate to one another according to the equation H_R=(D_AR−D_IR)/2. The ratio of ring outer diameter D_AR to ring height H_R, taking the ring material into account, has great importance for deformability of the ring. Examples of ring materials are Inco718 or In625, chromium-nickel steels such as Jethete, A286, or 17-4PH, aluminum alloys such as AlCu$_2$MgNi or RR350, and titanium alloys such Ti6242, Ti64, or titanium aluminide (TiAl). At least for these materials and for materials or alloys having similar strength values, for defining a maximum ring height H_R at a constant ring outer diameter D_AR the following relation is valid: $12 \leq D\_AR/H\_R$. For defining a minimum ring height H_R at a constant ring outer diameter D_AR, the following relation is valid: $D\_AR/H\_R \leq 37$. In particular, the relationship $15 \leq D\_AR/H\_R \leq 37$ is valid. Preferred ring outer diameters D_AR are in a range between 180 mm and 314 mm. Preferred ring heights H_R are in a range of 8 mm to 10.50 mm. It is particularly preferred if the ratio of ring outer diameter D_AR to ring height H_R is also selected in such a way that ring segments 30, 32, and thus inner ring 4, is/are only elastically deformed during installation, and after relaxing has/have no plastic deformation, and is/are thus tension-free. However, the ratio may also be selected in such a way that, although plastic deformation of ring segments 30, 32 occurs during installation, the ring segments once again assume their original undeformed shape after final installation, i.e., in a manner of speaking undergo elastic recovery during installation of bearing bushes 8 and seal carrier 6. However, to avoid damage of ring segments 30, 32, this plastic deformation should not be excessive. In testing, plastic elongation of ring segments 30, 32 of up to 0.2% of the elastic limit has been acceptable from an installation standpoint and a structural mechanical standpoint.

Figure 7:
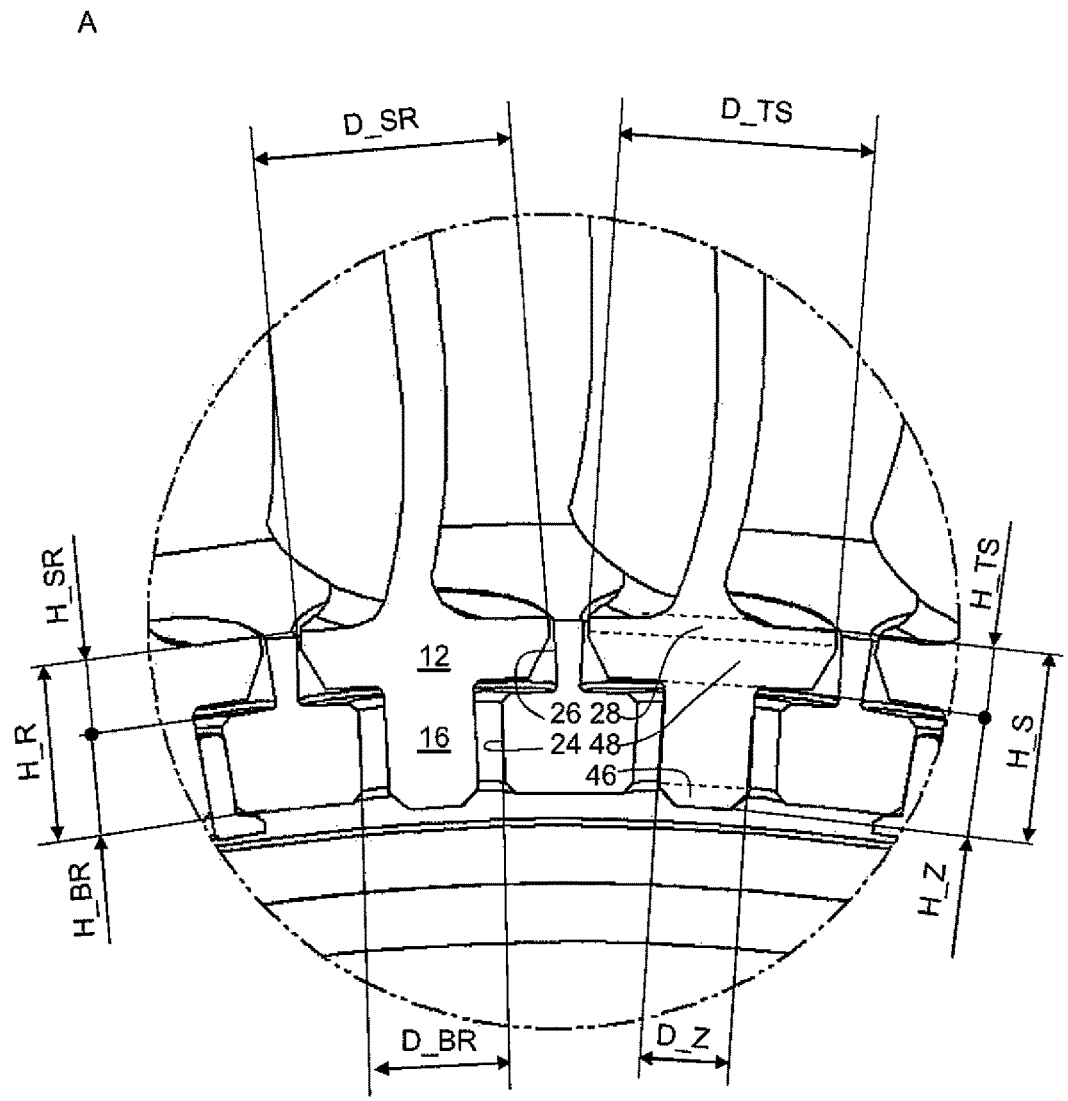
FIG. 7 shows a detailed illustration from FIG. 1.

As shown in FIG. 7, further parameters for influencing an installation of inner ring 4 besides ring outer diameter D_AR, ring inner diameter D_IR, and ring height H_R are at least one journal bearing diameter D_Z, a journal bearing height H_Z, a diameter D_BR of bearing section 24 on the opening side, a height H_BR of bearing section 24, an inner shroud diameter D_TS, an inner shroud height H_TS, a diameter D_SR of enlargement 26 on the opening side, a height H_SR of enlargement 26, and an overall height H_S over journal bearing 16 and enlargement 26.

Journal bearings 16 having a radial gap size $s=(D\_BR-D\_Z)/2$, corresponding to the wall thickness of bearing bushes 8, are advantageously accommodated in openings 22. A minimum wall thickness of 0.30 mm is possible when conventional bearing bush materials are used, so that the following is valid: $(D\_BR-D\_Z)/2 \geq 0.30$ mm. This relationship also shows that when the bearing bush wall thickness is increased, either both diameters D_BR and D_Z may be changed, or only one of diameters D_BR, D_Z is to be adjusted. If, for example, bearing bushes 8 having preferred wall thicknesses of 1.45 mm to 1.5 mm are to be used, gap size s is settable by increasing diameter D_BR of bearing section 24 on the opening side, or by decreasing journal bearing diameter D_Z.

For a small ring height H_R, inner ring 4 preferably has a small gap size s. Similarly, for a large ring height H_R, inner ring 4 has a large gap size s. It is advantageous if ring outer diameter D_AR is additionally taken into account according to the relationship $(D\_AR/H\_R)*s \geq 3.60$ mm.

In principle, it is preferred if blade sections 12, 16 accommodated in openings 22 have an overall height H_S which corresponds to ring height H_R. Although ring height H_R may also be increased with respect to overall height H_S, overall height H_S should preferably be smaller than ring height H_R, as expressed by the relationship $0.17 \leq H\_S/H\_R \leq 1.30$. It is particularly advantageous if a journal bearing height H_Z is a maximum of six times larger than an inner shroud height H_SR, so that the following is valid: $1 \leq H\_Z/H\_TS \leq 6$. This prevents the free end sections of journal bearings 16 from protruding too far from bearing sections 24 of openings 22 on the peripheral side, which would require, among other things, modifications of seal carrier 6. Height H_Z of journal bearings 16 preferably corresponds to a height H_BR of bearing section 24, so that, as shown in FIG. 7, journal bearings 16 protrude from bearing section 24 only at a short, nonbearing beveled end section 46.

In addition to radially outward cylindrical section 28 having a diameter D_TS for sealing annular space 20, inner shrouds 12 have a radially inward conical section 48 having a cone angle for simplifying installation. The cone angle preferably increases with increasing outer diameter D_TS. However, for sealing annular space 20 and for ensuring low-friction adjustment of guide blades 2, it is preferred that cylindrical sections 28 have a radius which at a minimum is 0.05 mm smaller than a radius of enlargements 26. However, for the sake of sealing, the inner shroud radius should not exceed the enlargement radius by more than 1 mm, so that the following is preferably valid: $0.05$ mm $\leq (D\_SR-D\_TS)/2 \leq 1$ mm.

An inner ring for forming a guide blade ring for a turbomachine is disclosed, composed of at least two one-part ring segments having a plurality of openings, closed on the peripheral side, for accommodating journal bearings on the blade side, the outer diameter of the inner ring being at least 12 times larger than its height. Also disclosed are a guide blade ring having this type of inner ring and a turbomachine having this type of guide blade ring.

LIST OF REFERENCE SYMBOLS 1 guide blade ring
2 guide blades
4 inner ring
6 seal carrier
8 bearing bushes
10 blade
12 inner shroud
14 outer shroud
16 journal bearing
18 adjusting pin
20 annular space
21 hammer head
22 opening
24 bearing section
26 enlargement
28 cylindrical section
30 ring segment
32 ring segment
34 parting plane
36 carrier segment
38 carrier segment
39 inner peripheral surface
40 installation device
42 clamping section
44 clamping arm
46 end section
48 conical section
R_AR outer radius of inner ring
R_SP clamping radius
P contact point
D_IR inner diameter of inner ring
D_AR outer diameter of inner ring
H_R height of inner ring
D_Z diameter of journal bearing
H_Z height of journal bearing
D_BR diameter of bearing section of opening
H_BR height of bearing section of opening
D_TS diameter of inner shroud
H_TS height of inner shroud D_SR diameter of enlargement of opening
H_S sum of height of journal bearing and height of inner shroud

What is claimed is:

1. An inner ring for forming a guide blade ring for a turbomachine including a plurality of guide blades, the inner ring comprising:
at least two ring segments having a plurality of openings, closed on a peripheral side, for accommodating journal bearings of the guide blades, the inner ring having an outer diameter (D_AR) and a height (H_R) and wherein the following relationship is valid: D_AR/H_R≥12, the ring segments being made of metal.

2. The inner ring as recited in claim 1 wherein the following relationship is valid: D_AR/H_R≤37.

3. The inner ring as recited in claim 1 wherein the inner ring has a residual maximum deformation of 0.2% after tension is relieved.

4. The inner ring as recited in claim 1 wherein the metal includes nickel, titanium or aluminum.

5. The inner ring as recited in claim 4 wherein the metal includes nickel, aluminum or titanium alloys.

6. A guide blade ring comprising:
a plurality of guide blades;
an inner ring for forming a guide blade ring for a turbomachine including a plurality of guide blades, the inner ring including at least two ring segments having a plurality of openings, closed on a peripheral side, for accommodating journal bearings of the guide blades, the inner ring having an outer diameter (D_AR) and a height (H_R) and wherein the following relationship is valid: D_AR/H_R≥12;
a plurality of bearing bushes inserted in the openings in the inner ring for guiding journal bearings of the guide blades; and
a seal carrier for securing the bearing bushes in the openings.

7. The guide blade ring as recited in claim 6 wherein the following relationship is valid: (D_BR−D_Z)/2≥0.30 mm, where (D_BR) is an inner diameter of the openings and (D_Z) is an outer diameter of the journal bearings.

8. The guide blade ring as recited in claim 6 wherein the following relationship is valid: (D_AR/H_R)*s≥3.60 mm, where s is (D_BR−D_Z)/2, (D_BR) is an inner diameter of the openings and (D_Z) is an outer diameter of the journal bearings.

9. The guide blade ring as recited in claim 6 wherein the following relationship is valid: 0.17≤H_S/H_R≤1.30, where (H_S) is a height of the journal bearings and of inner shrouds of the guide blades accommodated in radial enlargements of the openings.

10. The guide blade ring as recited in claim 6 wherein the following relationship is valid: 1≤H_Z/H_TS≤6, where (H_Z) is a height of the journal bearings and (H_TS) is a height of inner shrouds of the guide blades.

11. The guide blade ring as recited in claim 6 wherein the following relationship is valid: 0.05 mm≤(D_SR−D_TS)/2≤1 mm, where (D_SR) is an inner diameter of enlargements of the openings and (D_TS) is a diameter of inner shrouds of the guide blades.

12. A turbomachine comprising the guide blade ring as recited in claim 6.

13. The guide blade ring as recited in claim 6 wherein the ring segments are made of metal.

14. The guide blade ring as recited in claim 13 wherein the metal includes nickel, titanium or aluminum.

15. The guide blade ring as recited in claim 14 wherein the metal includes nickel alloys.

16. The guide blade ring as recited in claim 14 wherein the metal includes an aluminum alloy.

17. The guide blade ring as recited in claim 14 wherein the metal includes a titanium alloy.

18. The guide blade ring as recited in claim 6 wherein the ring segments are made of a fiber composite.

19. An inner ring for forming a guide blade ring for a turbomachine including a plurality of guide blades, the inner ring comprising:
two semicircular ring segments having a plurality of openings, closed on a peripheral side, for accommodating journal bearings of the guide blades, the inner ring having an outer diameter (D_AR) and a height (H_R) and wherein the following relationship is valid: D_AR/H_R≥12, the two semicircular ring segments forming the inner ring, each ring segment having a curve of 180 degrees.

20. The inner ring as recited in claim 19 wherein the ring segments are made of metal.

* * * * *